United States Patent [19]
Kopko

[11] Patent Number: 5,947,854
[45] Date of Patent: Sep. 7, 1999

[54] COMBINED VARIABLE-SPEED DRIVE AND SPEED REDUCER FOR PUMPS AND FANS

[75] Inventor: William L. Kopko, Springfield, Va.

[73] Assignee: WorkSmart Energy Enterprises, Inc., Washington, D.C.

[21] Appl. No.: 09/053,082

[22] Filed: Apr. 1, 1998

Related U.S. Application Data

[60] Provisional application No. 60/046,035, May 8, 1997, and provisional application No. 60/046,765, May 8, 1997.

[51] Int. Cl.⁶ .............................. F16H 3/72; F16H 37/06
[52] U.S. Cl. ............................. 475/2; 475/153; 62/228.4
[58] Field of Search .................................. 475/2, 5, 149, 475/150, 153; 62/228.4

[56] References Cited

U.S. PATENT DOCUMENTS

| | | | |
|---|---|---|---|
| 2,433,194 | 12/1947 | Bedford et al. | 475/2 X |
| 4,112,311 | 9/1978 | Theyse | 475/2 X |
| 4,423,794 | 1/1984 | Beck | 475/149 X |
| 4,514,991 | 5/1985 | Zinsmeyer | 475/2 X |
| 4,574,656 | 3/1986 | McCarthy et al. | 475/2 X |
| 4,686,378 | 8/1987 | Sisk | 475/2 X |
| 4,973,295 | 11/1990 | Lee | 475/153 |
| 5,039,281 | 8/1991 | Johnston | 475/2 X |

*Primary Examiner*—Khoi Q. Ta
*Attorney, Agent, or Firm*—Rothwell, Figg, Ernst & Kurz

[57] ABSTRACT

A variable speed drive for fans and pumps. An impeller is connected to a primary motor and an auxiliary motor/generator through a transmission. The transmission includes an epicyclic gearing system. The primary motor is run at constant speed. The auxiliary motor/generator is driven at variable speeds to control the speed of the impeller. The device may be used to retrofit an existing pump or fan system.

19 Claims, 6 Drawing Sheets

COMBINED VARIABLE-SPEED DRIVE AND SPEED REDUCER FOR PUMPS AND FANS

Applicant claims benefit of co-pending provisional U.S. application Ser. Nos. 60/046,035 and 60/046,765 that were both filed on May 8, 1997.

BACKGROUND OF THE INVENTION

1. Field of the Invention

This invention relates generally to a variable-speed drive system for fans and pumps and more particularly to a combination variable-speed drive and speed reducer for a fan or a pump using a transmission that combines shaft inputs from a primary motor and an auxiliary motor/generator.

2. Discussion of the Background

The energy cost of fans and pumps amounts to tens of billions of dollars each year in the U.S. alone. Worldwide the cost probably exceeds one hundred billion dollars per year. Engineers and designers have devoted enormous effort in developing electrical and mechanical methods of varying capacity of fans and pumps, but most fans and pumps are still operated at constant flow.

Controlling the speed of fans and pumps is an important factor in reducing energy use in many applications. Fluid moving devices typically involve a cubic relationship between power and speed. At the same time flow is directly proportional to speed. These relationships mean that running a fan or pump at half speed gives half flow but uses only one eighth of the design input power. Other means of reducing flow such as throttling valves, inlet vanes, etc. give much smaller energy savings and usually have much higher noise levels than those found with variable speed fans and pumps.

In addition, it is frequently desirable to run a fan or pump at slow speeds, even at design conditions. For example, efficiency and sound levels decrease quite rapidly with the use of larger diameter, slower speed fans moving the same air flow. Common devices for providing slower speed include slow speed motors, which are costly and limited in availability. Belt drives are an inexpensive alternative, but require regular maintenance and reduced reliability. Gear drives are also sometimes used and give a higher reliability than belts but at an increased cost in many cases.

Several systems have been used for controlling the speed of fans and pumps. Among the more common are multispeed motors, variable frequency drives with induction motors, and magnetic clutches.

Epicyclic gears have been used as a part of variable-speed drive for a wide range of applications. Such devices have been described in U.S. Pat. Nos. 436,127; 711,663; 854,721; 855,623; 1,197,789; 1,235,132; 1,270,028; 1,409,061; 1,442,217; 1,500,860; 1,594,396; 1,828,944; 2,133,365; 2,384,776; 2,390,240; 2,390,487; 2,397,062; 2,436,936; 2,440,614; 2,485,126; 2,578,837; 2,581,886; 2,666,876; 2,693,080; 2,757,856; 3,405,572; 3,729,957; 3,853,432; 4,086,019; 4,441,462; 4,514,991; 4,467,230; 4,525,655; 4,579,019 and 4,916,894.

Drives for other applications have been developed that use a mechanical transmission to combine the input from two electric motors. Among the earliest mention of this approach is Edison U.S. Pat. No. 436,127 that describes a system for driving street cars.

Zinsmeyer, U.S. Pat. No. 4,514,991 describes a system for use with centrifugal compressors in a vapor compression system. This system is not suitable for fans and pumps since it is specifically designed to compress gas rather than move a fluid. It also is designed to increase the speed of the compressor compared to the motor input speed.

SUMMARY OF THE INVENTION

Accordingly, one object of this invention is to provide a new and improved variable-speed drive system for fans and pumps.

Another object of this invention is to provide a variable-speed drive for retrofitting existing fan and pump systems.

A further object of this invention is to provide a variable-speed pump and fan drive system with reduced power consumption.

A still further object of this invention is to provide a variable speed drive which is reliable, small in size and low in cost.

Briefly, these and other objects of the invention are achieved by providing a primary motor which runs at constant speed, and an auxiliary motor/generator which can be run at different speeds. A transmission connects the two motors with the pump or fan impeller. The transmission includes epicyclic gears.

Specifically the present invention provides a variable-speed fluid moving apparatus that comprises an impeller that moves a fluid by rotation, a primary motor which runs at a predetermined constant rotational speed, an auxiliary motor/generator which runs at controllable variable speed and a transmission means for drivingly connecting said primary motor and said auxiliary motor/generator to said impeller so that changes in the rotational velocity of said auxiliary motor/generator vary the rotational speed of said impeller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A is a diagram of an alternate embodiment of FIG. 3, which uses a belt drive transmission;

DESCRIPTION OF THE PREFERRED EMBODIMENTS

Figure 1:
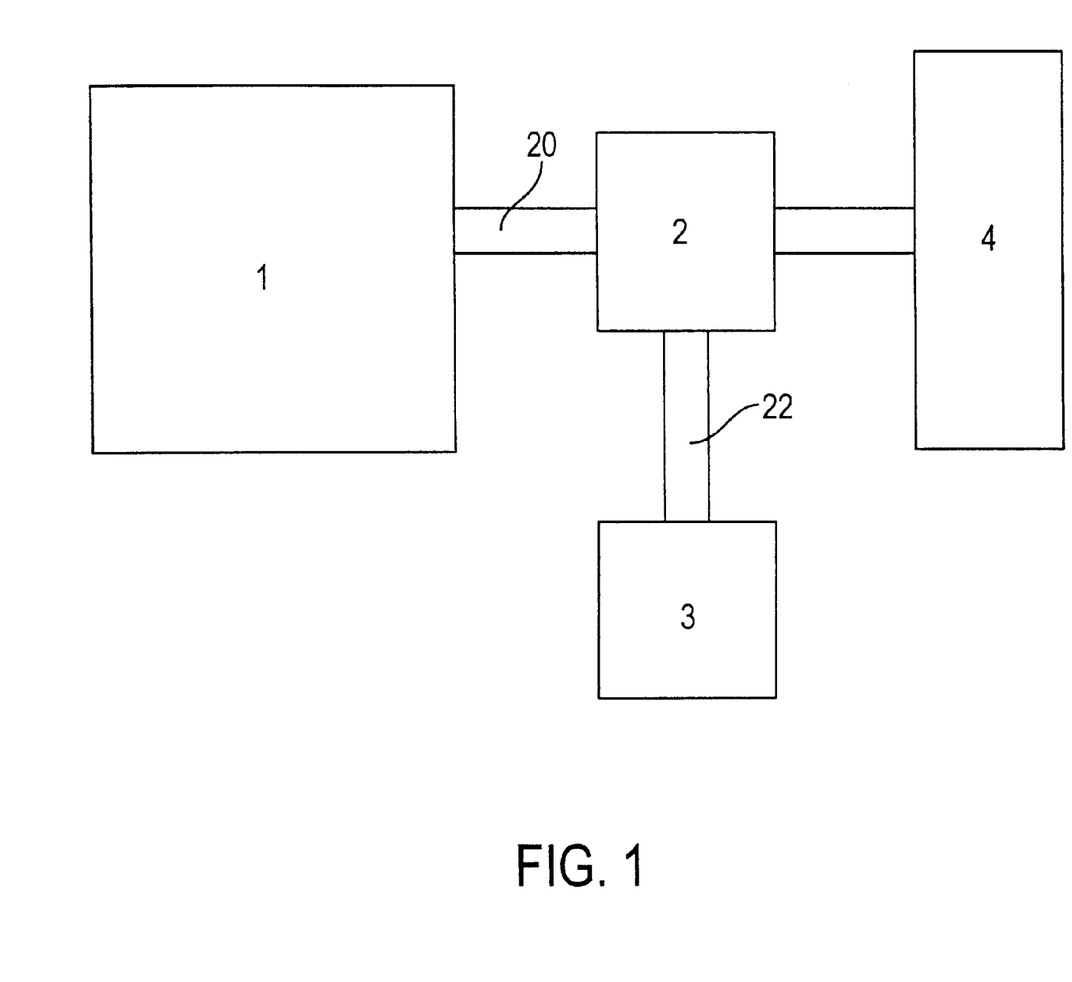
FIG. 1 is a general block diagram of the invention.

FIG. 1 is a block diagram showing the basic arrangement of the present invention. Primary electric motor, 1 and auxiliary motor/generator, 3 are connected to transmission means, 2. The transmission combines two inputs into one output that drives impeller 4.

The primary electric motor 1 would typically be a constant-speed induction motor, although multispeed motors or other types of motors are possible. The chief advantages of a fixed-speed induction motor are its relatively low cost, simplicity, reliability, and good efficiency.

The auxiliary 3 would normally be an induction motor with a variable-frequency drive that can also operate as a generator. Other options would be for it to operate only as a motor or only as generator. While a variable-frequency induction motor is the most likely choice, other possible drives include multispeed induction motors, direct-current motors, switched-reluctance motors, or high-slip induction motors. As will be described later, using a drive system that can act as both as a motor and a generator would have some advantage is sizing the equipment, although use exclusively as a generator is also a good option.

The transmission means 2 combines the shaft input 20 from the primary motor and shaft input 22 from auxiliary motor/generator into one output for impeller, 4. The transmission means would typically comprise epicyclic gears. It may also include a belt drive, (such as shown in FIG. 3A) especially in retrofit of existing belt-driven equipment. The maximum output speed from the transmission would normally be the same or slower than the speed of the primary motor.

One advantage of the transmission is the possibility of reducing size and cost of the primary motor. Motor weight is roughly proportional to torque, which is inversely proportional to speed for a given output power. This analysis means that the material weight and cost for a 1200 rpm motor is roughly three times that of a 3600 rpm motor with the same horsepower rating. The ability of the transmission to lower the output speed will allow the use of higher-speed motors which should translate into a savings of motor material cost. The smaller size will also aid in fitting the system into spaces occupied by existing motors and should reduce installation and inventory costs.

In operation the primary motor 1 would be run at a constant speed to drive transmission 2. Auxiliary motor/generator 3 would be run at a variable speed to change the output speed of transmission 2 to variably decrease the speed of impeller 4.

Figure 2:
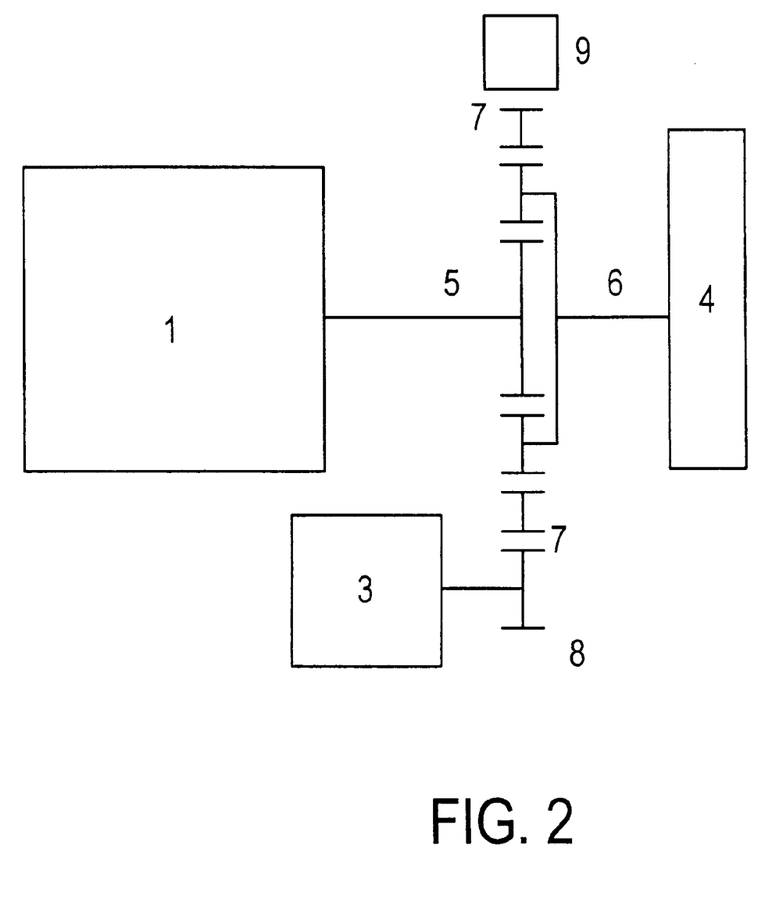
FIG. 2 is a diagram of a first embodiment of the invention.

FIG. 2 shows a preferred embodiment for a new system that achieves a large speed reduction. The primary motor, 1, drives the sun gear, 5, in a planetary gear system. The auxiliary motor/generator, 3, is attached to gear, 8, which drives the ring gear, 7. Planet carrier, 6, drives impeller, 4. Brake, 9, can be manually activated to prevent rotation of the ring gear. This setup can easily achieve a 2:1 to 3:1 speed reduction. The primary motor may be a two-pole induction motor and the auxiliary motor/generator can run to speeds of 3600 rpm or higher using a variable frequency drive.

The preferred embodiment operates as follows. The primary motor 1 runs essentially at a constant speed and also drives the sun gear 5 at a constant speed. The auxiliary motor/generator 3 varies the speed of the ring gear 7. The planet carrier 6 sums the input from the ring gear and the sun gear, which means that a change in the speed of the auxiliary motor/generator changes the speed of the planet carrier. Since the planet carrier is connected to the impeller 4, the impeller speed also varies in response to the speed of the auxiliary motor/generator. The maximum speed of the impeller corresponds the motor/generator acting as a motor to add power to the transmission. At minimum speed the motor/generator acts as generator to take power out of the transmission. The brake 9 prevents the ring gear from rotating and allows the main motor to drive the impeller at an intermediate speed.

An alternate configuration is to connect the motor/generator to the planet carrier while the ring gear drives the impeller. It may also be desirable to add additional gears to adjust the speed inputs to or outputs from the transmission.

Another possibility is to have a transmission that has a maximum output speed that closely matches the speed of the primary motor. This arrangement would be useful in retrofit situations where the existing motor is retained. There are various approaches to do this.

Figure 3:
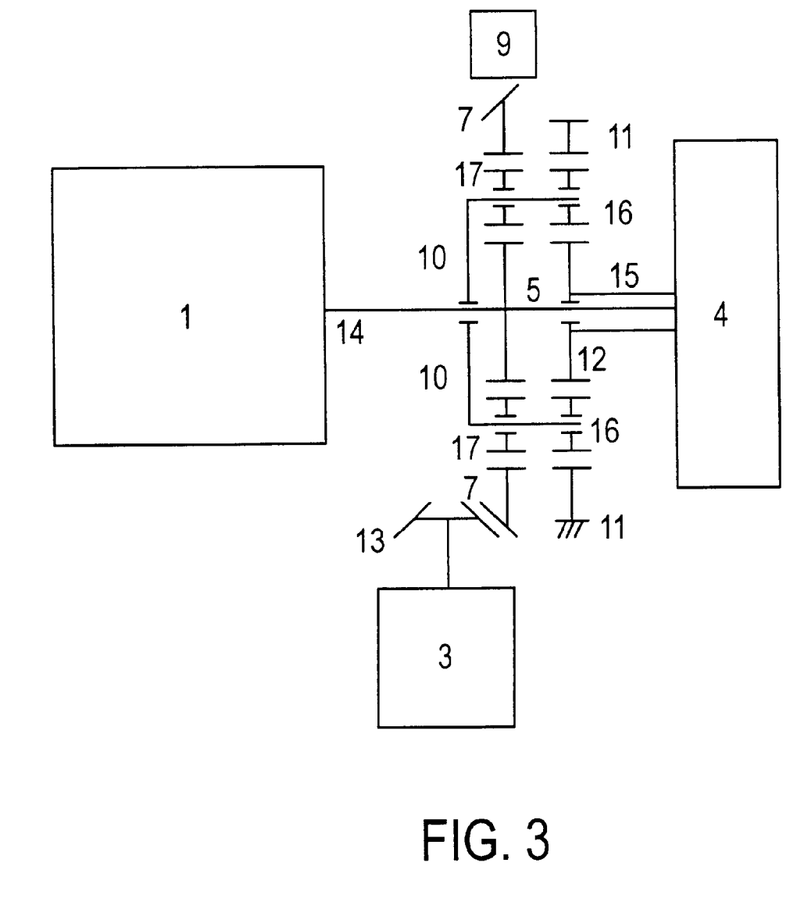
FIG. 3 is a diagram of a second embodiment of the invention used to retrofit an existing system.

FIG. 3 shows a preferred embodiment that is suitable for retrofit use. It uses two planetary gear systems. Input shaft, 14, is attached to primary motor, 1, and first sun gear, 5. The sun gear, 5, in turn drives a pair of planet gears, 17, that revolve about the sun gear and drive planet carrier, 10. This planet carrier is free to rotate about the input shaft and holds the planet gears for both systems. Auxiliary motor/generator, 3, drives gear, 13, which drives a first ring gear, 7. Brake, 9, prevents rotation of the first ring gear in cases when the auxiliary motor/generator is not running. A second ring gear, 11, does not rotate and may be attached to the base of the primary motor or other suitable support. The planet carrier drives a second set of planet gears, 16, that mesh with the second ring gear and that drive a second sun gear, 12. The output shaft, 15, is attached to the second sun gear 12 and impeller, 4. The output shaft 15 is hollow, fits around the input shaft, and is free to rotate about the input shaft. This embodiment is meant to be used in retrofit situations with a minimum of changes and may use an existing motor as the primary motor.

If the gears for the two planetary systems are the same, then the motor/generator would preferably run only as a generator. The maximum speed of the impeller would be the same as the speed of the primary motor when the auxiliary generator shaft is not turning.

FIG. 3A shows an alternate embodiment of a drive system similar to FIG. 3, but using a belt drive consisting of pulleys 20 and 22, and belt 21, whereby the impeller 4 is driven indirectly through the belt drive instead of directly as in FIG. 3.

An alternate setup would allow the auxiliary motor/generator to run in both directions with the maximum speed of the impeller equal to that of the primary motor. This would require a slightly different gear ratio for the two planetary gear systems to give a small speed reduction when the auxiliary shaft is not turning. Both configurations may be especially useful in the retrofit of direct-drive fans and pumps and may allow the use of the existing primary motor.

The transmission would normally include a brake to prevent rotation of the shaft from the auxiliary motor/generator. This brake can be manually or automatically activated in cases of a failure of the auxiliary motor/generator so as to allow the primary motor to drive the impeller at a constant speed. Another alternative for cases when the auxiliary motor/generator operates as a motor only, is to use a stop to prevent backward rotation of the auxiliary shaft. This simple, lowcost device for continuing operation in cases of a failure of the variable-speed drive is a major advantage of the invention.

In terms of the sizing for the auxiliary motor/generator for a fan or pump with a cubic power relation to speed, $$P_{aux}=P_{out,0}(N_{out}/N_{out,0})^2(N_{out}/N_{out,0}-1)$$

where $P_{aux}$=auxiliary motor/generator power,
$P_{out,0}$=output power when the auxiliary shaft speed is zero,
$N_{out}$=output shaft speed, and
$N_{out,0}$=output shaft speed when the auxiliary shaft speed is zero.

Figure 4:
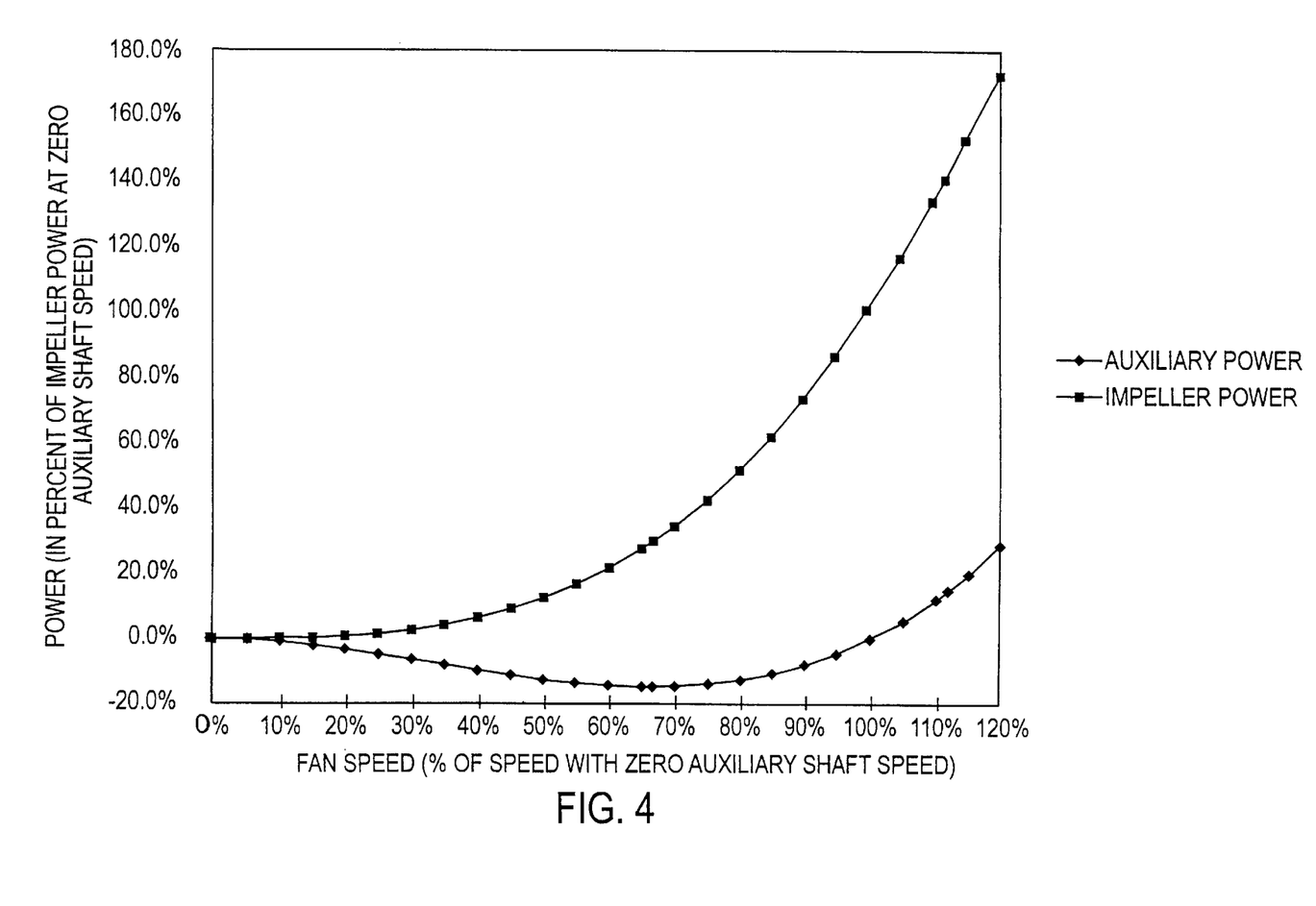
FIG. 4 is a graph of the fan speed compared to power.

FIG. 4 shows how the auxiliary input power varies as a function of output shaft speed. The reference condition corresponds to a zero auxiliary input shaft speed. For output speeds below this point the auxiliary power is negative, which means that the auxiliary shaft is removing power from the drive. The auxiliary power reaches a minimum value (maximum absolute value) of −4/27 of the output power at ⅔ of the reference speed.

At output speeds above the reference speed, the auxiliary power is positive which means it is adding power to the drive. The auxiliary power reaches +4/27 of the reference power at an output speed of 1.118 of the reference speed. This speed corresponds to an output power of 1.40 times the reference power.

This analysis can be used to size the auxiliary input. In the case of a generator, the maximum fan speed occurs when the auxiliary shaft is stopped. The maximum heat generated occurs at ⅔ of full output speed and corresponds to 4/27 of the full load fan power. Thus for a 100 hp fan, the generator would have to be capable of handling 14.8 hp.

For the case of an auxiliary motor/generator that can rotate in two directions, its power requirements are even smaller. If the auxiliary shaft input is sized to handle the same power in either direction, the requirement is reduced by a factor of 1.40. The net result is that the auxiliary input can be sized for slightly over 10% of the total full-load output. This analysis means that that a 90 hp fixed-speed motor and 10 hp variable-speed motor/generator can supply power for a 100 hp fan.

Figure 5:
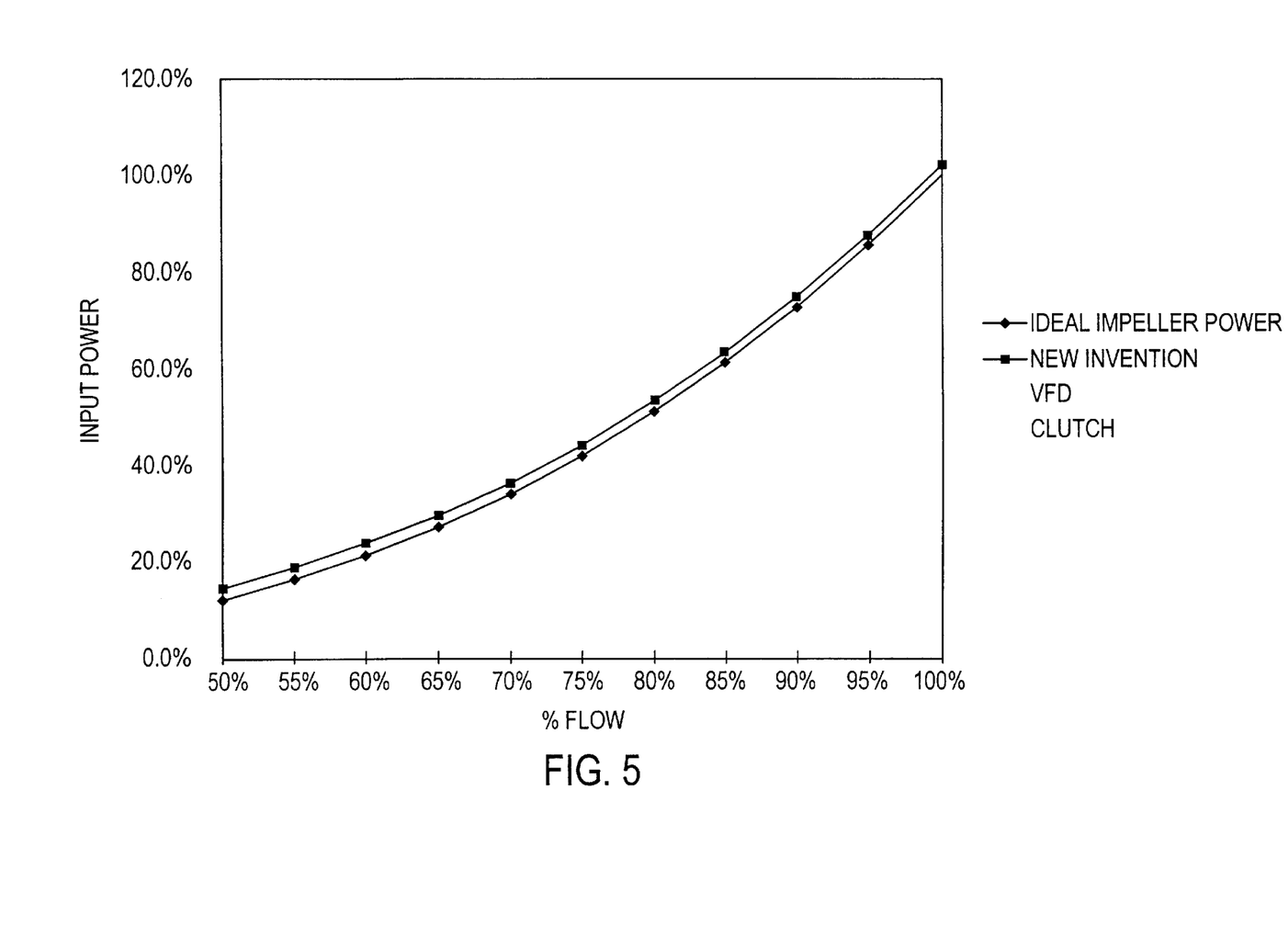
FIG. 5 is a graph of the flow as compared to the input power.

FIG. 5 shows how the invention can give extremely high operating efficiency compared to existing systems. Epicyclic gears can attain efficiencies of 99%, which means there is almost no loss from the fixed-speed motor to the fan. Since the auxiliary motor/generator is so small, its losses are also small. The result is a system for varying fan or pump speed that is more efficient than any other now in commercial use.

An additional benefit of this invention is a reduction in electrical noise associated with variable-frequency drives. The current required by the drive for the auxiliary motor/generator is an order of magnitude less than that required to drive the primary motor. The result is a corresponding reduction in the electrical noise produced, which should be a significant benefit in applications near computers, communications gear, and other sensitive equipment.

What is claimed as new and is desired to be secured by Letters Patent of the United States is:

1. A variable-speed fluid-moving apparatus comprising:
   an impeller that moves a fluid by rotation;
   a primary motor which runs at predetermined constant rotational speed;
   an auxiliary motor/generator which runs at controllable variable speed; and
   transmission means for drivingly connecting said primary motor and said auxiliary motor/generator to said impeller so that changes in the rotational velocity of said auxiliary motor/generator vary the rotational speed of said impeller;
   wherein, when a rotational speed of said auxiliary motor/generator is zero, the rotational speed of said impeller does not exceed that of said primary motor.

2. The variable-speed fluid-moving apparatus of claim 1 wherein said transmission means comprises epicyclic gears.

3. The variable-speed fluid-moving apparatus of claim 2 wherein said epicyclic gears comprise a sun gear that is drivingly connected to said primary motor, a planet carrier that is drivingly connected to said impeller, and a ring gear that is drivingly connected to said auxiliary motor/generator.

4. The variable-speed fluid-moving apparatus of claim 2 wherein said epicyclic gears comprise a sun gear that is drivingly connected to said primary motor, a planet carrier that is drivingly connected to said auxiliary motor/generator, and a ring gear that is drivingly connected to said impeller.

5. The variable-speed fluid-moving apparatus of claim 1 wherein a design output power of said auxiliary motor/generator is between five and twenty percent of impeller power at maximum impeller speed.

6. The variable-speed fluid-moving apparatus of claim 1 wherein said auxiliary motor/generator further comprises a brake means.

7. The variable-speed fluid-moving apparatus of claim 6 wherein said brake means is manually engagable to prevent rotation of said auxiliary motor/generator.

8. The variable-speed fluid-moving apparatus of claim 1 wherein said transmission means includes a brake means for preventing rotation of said auxiliary motor/generator.

9. The variable-speed fluid-moving apparatus of claim 1 wherein said motor/generator means comprises an alternating-current motor/generator with a variable frequency drive for controlling speed and direction of rotation.

10. The variable-speed fluid-moving apparatus of claim 2 wherein the transmission means further comprises a belt drive.

11. The variable-speed fluid-moving apparatus of claim 2 wherein said epicyclic gears comprise two sets of planetary gears.

12. A method for adding variable-speed control to an existing fluid impeller that is driven by a belt drive that receives power from a motor comprising the steps of:
   providing an auxiliary shaft input,
   providing a transmission that has two inputs and one output,
   inserting said transmission between said motor and said impeller so that said existing motor is drivingly connected to one of the inputs of said transmission means and the output of said transmission means is drivingly connected to said impeller,
   connecting said auxiliary shaft input to the other input of said transmission, and
   adjusting the ratio of pulley diameters in said belt drive to achieve the desired maximum impeller speed.

13. The method of claim 12 further comprising the step of adding a brake means to said transmission to prevent rotation of said auxiliary shaft input.

14. The method of claim 12 further comprising the step of adding a brake means to said auxiliary shaft input.

15. The method of claim 12 wherein said auxiliary shaft input comprises an motor/generator.

16. A variable-speed fluid-moving apparatus comprising:
   an impeller that moves a fluid by rotation;
   a primary motor which runs at predetermined constant rotational speed;
   an auxiliary generator which runs at controllable variable speed; and
   transmission means for drivingly connecting said primary motor and said auxiliary generator to said impeller so that changes in the rotational velocity of said auxiliary generator vary the rotational speed of said impeller;
   wherein, when a rotational speed of said auxiliary generator is zero, the rotational speed of said impeller does not exceed that of said primary motor.

17. The variable-speed fluid-moving apparatus of claim 16 wherein a design shaft power of said auxiliary generator between ten and twenty percent of design power of said impeller.

18. The variable-speed fluid-moving apparatus of claim 16 wherein a design power of said auxiliary electric motor is approximated by the equation:

$$P_{aux} = P_{impeller}(N_{impeller,\,max} - N_{impeller,\,min})/N_{impeller\,max}$$

where $P_{aux}$ = the design power of said auxiliary electric motor, $P_{impeller}$ = the design power of said impeller,
$N_{impeller,\,max}$ = the maximum speed of said impeller, and
$N_{impeller,\,min}$ = the minimum speed of said impeller.

19. The variable-speed fluid-moving apparatus of claim 16 wherein a stop prevents backward rotation of said auxiliary electric motor.

* * * * *